United States Patent [19]
Wirthlin

[11] Patent Number: 6,029,783
[45] Date of Patent: Feb. 29, 2000

[54] VARIABLE RESISTANCE DEVICE USING ELECTROACTIVE FLUID

[76] Inventor: Alvin R. Wirthlin, 4655 S. Warren Ave., Springfield, Mo. 65810

[21] Appl. No.: 09/061,316

[22] Filed: Apr. 16, 1998

[51] Int. Cl.[7] .................................. F16F 15/03; F16F 5/00
[52] U.S. Cl. .................................... 188/267.1; 267/140.15
[58] Field of Search .............................. 188/267.1, 267.2, 188/269; 267/140.14, 140.15

[56] References Cited

U.S. PATENT DOCUMENTS

| | | |
|---|---|---|
| 2,846,028 | 8/1958 | Gunther . |
| 3,734,557 | 5/1973 | McKenzie . |
| 4,509,730 | 4/1985 | Shtarkman . |
| 4,591,030 | 5/1986 | Antkowiak . |
| 4,645,614 | 2/1987 | Goossens et al. . |
| 4,668,417 | 5/1987 | Goossens et al. . |
| 4,733,758 | 3/1988 | Duclos et al. . |
| 4,773,632 | 9/1988 | Härtel . |
| 4,869,476 | 9/1989 | Shtarkman . |
| 4,923,057 | 5/1990 | Carlson et al. . |
| 5,000,299 | 3/1991 | Goto et al. . |
| 5,050,850 | 9/1991 | Noguchi et al. . |
| 5,054,593 | 10/1991 | Carlson . |
| 5,068,018 | 11/1991 | Carlson . |
| 5,090,531 | 2/1992 | Carlson . |
| 5,176,368 | 1/1993 | Shtarkman . |
| 5,180,145 | 1/1993 | Watanabe et al. . |
| 5,248,113 | 9/1993 | Daniels ................................. 242/246 |
| 5,249,784 | 10/1993 | Murakami et al. . |
| 5,259,487 | 11/1993 | Petek . |
| 5,267,633 | 12/1993 | Endo et al. . |
| 5,353,559 | 10/1994 | Murota et al. . |
| 5,368,140 | 11/1994 | Takano et al. . |
| 5,398,785 | 3/1995 | Leitmann et al. . |
| 5,450,931 | 9/1995 | Masuda et al. . |
| 5,454,451 | 10/1995 | Kawamata et al. . |
| 5,458,217 | 10/1995 | Ohishi . |
| 5,462,361 | 10/1995 | Sato et al. ..................................... 384/9 |
| 5,477,946 | 12/1995 | Kawamata et al. . |
| 5,524,743 | 6/1996 | Bullough et al. . |
| 5,547,049 | 8/1996 | Weiss et al. . |
| 5,573,088 | 11/1996 | Daniels . |
| 5,590,746 | 1/1997 | Brotz ................................. 267/140.15 |

*Primary Examiner*—Matthew C. Graham
*Assistant Examiner*—Jeffrey Woller
*Attorney, Agent, or Firm*—Alvin R. Wirthlin

[57] ABSTRACT

A variable resistance device comprises an inner elongate, flexible electrode having a longitudinal central axis, at least one outer electrode spaced from the inner electrode and at least partially or completely surrounding the inner elongate electrode to form a gap therebetween. The outer electrode has a longitudinal axis that is at least substantially coaxial with the central axis of the inner elongate electrode. An electroviscous fluid is positioned in the gap between the inner and outer electrodes. An electric field applied to the electroviscous fluid between the inner and outer electrodes causes an increase in the stiffness of the device. In one embodiment of the invention, the outer electrode is also flexible to form a flexible resistance device, the stiffness of which can be controlled by the application of the electric field. In a further embodiment, an enclosed chamber is filled with an electroactive fluid and a piston assembly is mounted for reciprocal movement in the chamber. The piston assembly includes a piston head that divides the chamber into separate chamber portions. At least one bore extends through the piston and is in fluid communication with the chamber portions. An inner surface of the bore forms the outer electrode, while the inner electrode, which may be flexible or stiff, extends coaxially through the bore. When an electric field is applied to the electrodes, electroactive fluid in the bore increases in apparent viscosity and resists movement of the piston in the fluid. A plurality of bores of different diameters may be provided to control the desired amount of damping. The inner electrodes need not be present in all of the bores.

15 Claims, 7 Drawing Sheets

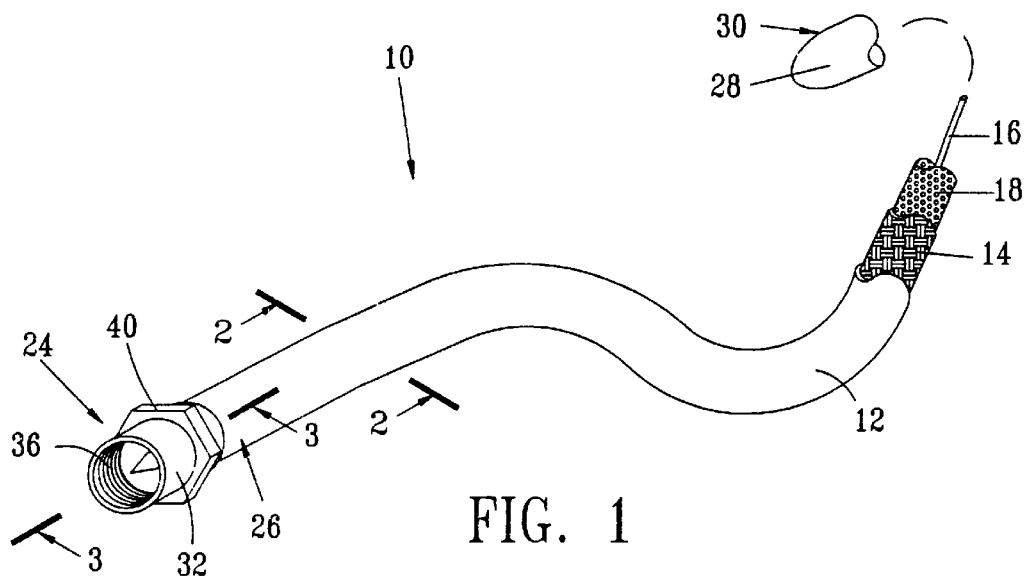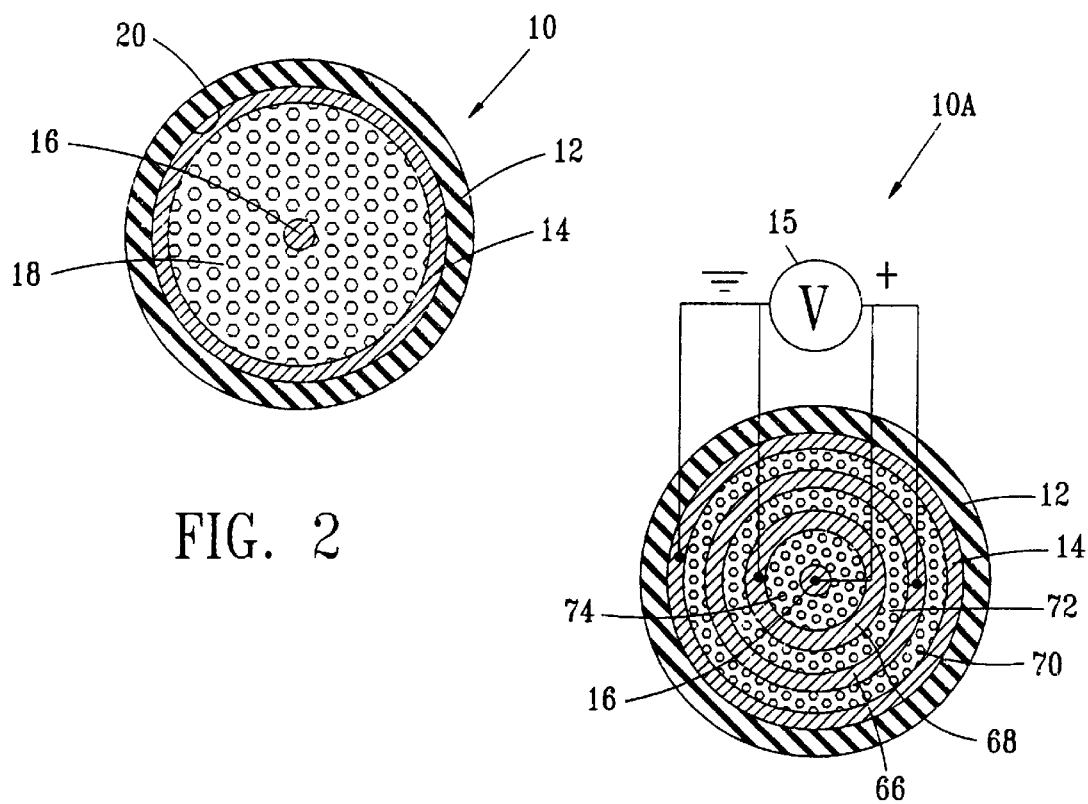

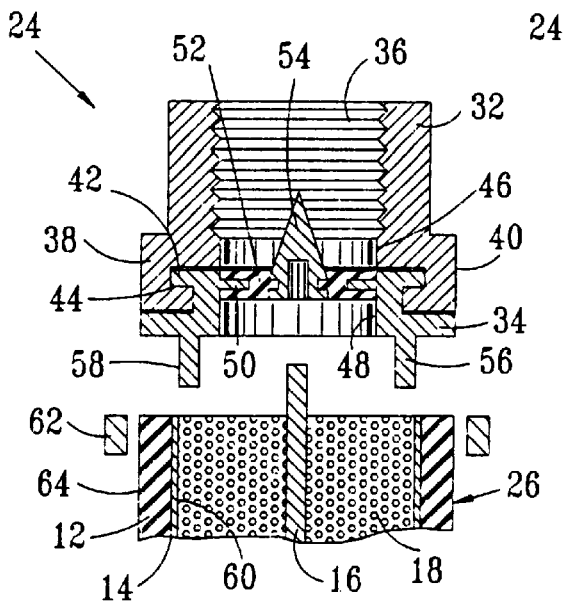
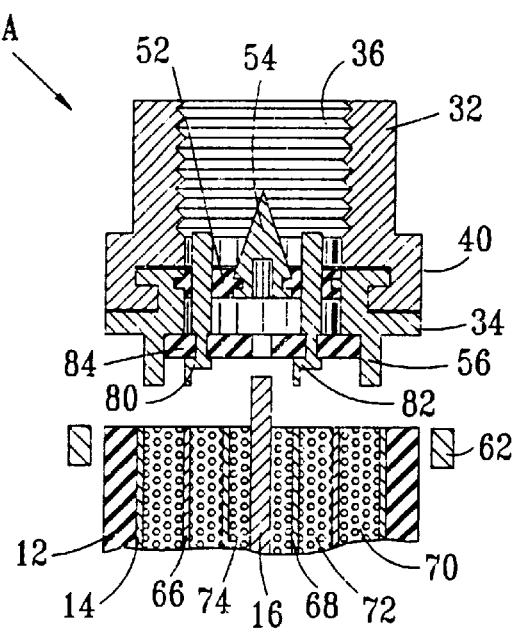
FIG. 3          FIG. 3A
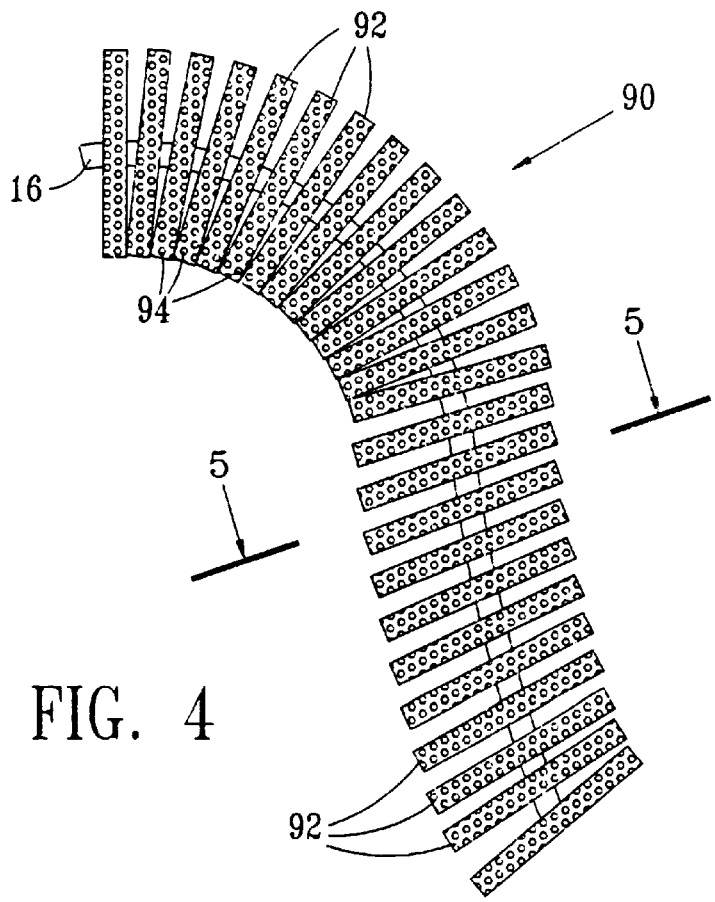
FIG. 4

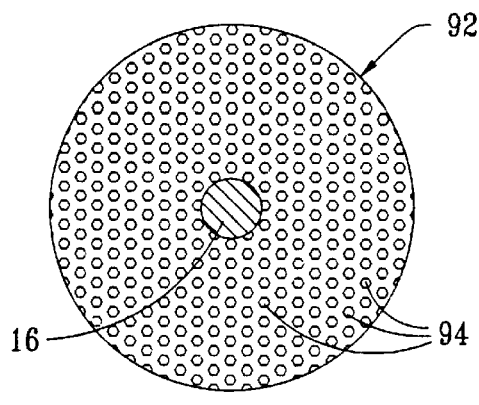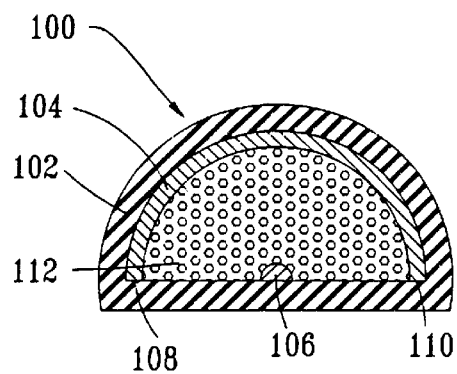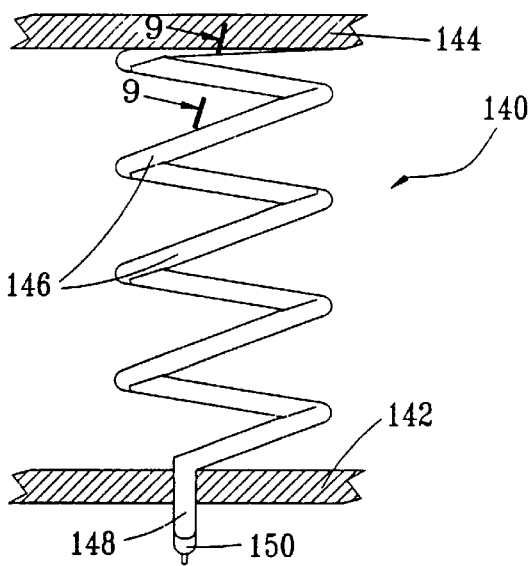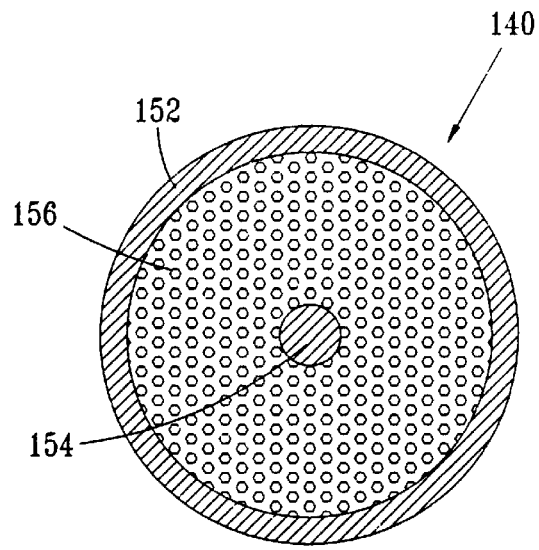

VARIABLE RESISTANCE DEVICE USING ELECTROACTIVE FLUID

BACKGROUND OF THE INVENTION

1. Field of the Invention

This invention relates to force resistance devices, and more particularly to devices that can be connected to two objects for resisting relative movement between the objects.

2. Description of the Related Art

Motion or vibration damping devices, such as machinery or engine mounts, shock absorbers, struts, etc., are well known. Many of these devices include hydraulic fluids or, more recently, field responsive fluids that exhibit changes in flow characteristics when subject to electrical or magnetic fields, such as electroactive fluids, ferro fluids, magnetic fluids, etc.

Included in the class of electroactive fluids are electrorheological (ER) fluids and electrophoretic fluids. ER fluids typically comprise a non-conducting, electrically insulating liquid or liquid mixture, such as silicone-based oils, mineral oils, hydrocarbon oils, etc., and a dispersal of solid particles that exhibit a measure of conductivity or semiconductivity within the oil. ER fluids exhibit Newtonian flow characteristics in the absence of an electric field, such that their shear rate is directly proportional to shear stress. However, when an electric field is applied, no shearing takes place until the shear stress exceeds a yield value which rises with increased electric field strength. The result can appear as an increase in apparent viscosity of several orders of magnitude. ER fluids are especially attractive due to their low electrical power requirements and their rapid and reversible response characteristics. Electrophoretic fluids are suspensions similar to ER fluids but respond quite differently in the presence of an electric field. Electrophoretic fluids typically include particles in the suspension that exhibit strong polar migration characteristics. Under an applied field, the electrophoretic fluid separates into particle-rich and particle-deficient phases as the particles migrate to a charged electrode. For example, the particles in a "positive" electrophoretic fluid migrate toward a positively charged electrode, whereas the particles in a "negative" electrophoretic fluid migrate toward a negatively charged electrode. This process can produce much higher yield strengths at lower operating voltages than ER fluids.

U.S. Pat. No. 5,477,946 issued to Kawamata et al. discloses a vibration damping device that takes advantage of ER fluid properties. The vibration damping device in this patent includes two flexible membrane members having a first end portion connected to a piston member and a second end portion connected to respective faceplates to form two closed chambers. The piston member includes an elongate passage and openings that connect the chambers to each other through the passage. The chambers and passage are filled with an ER fluid. An electrical field can be applied to the ER fluid in the passage to restrict movement of the fluid from one chamber to the other as the piston member is moved.

SUMMARY OF THE INVENTION

According to the invention, a variable resistance device comprises at least one inner elongate, flexible electrode having a longitudinal central axis, at least one outer electrode spaced from the inner electrode and at least partially surrounding the inner elongate electrode to form a gap therebetween, and an electroviscous fluid positioned in the gap between the inner and outer electrodes. Preferably, the outer electrode has a longitudinal axis that is at least substantially coaxial with the central axis of the inner elongate electrode. In this manner, an electric field applied to the electroviscous fluid between the inner and outer electrodes causes an increase in the stiffness of the device. The flexible inner electrode may be constructed of a single solid wire or a plurality of wire strands, a flexible conductive rod, a conductive foam, or any other flexible, conductive material.

According to a further embodiment of the invention, the variable resistance device includes a housing having a bottom wall, at least one side wall, and a top wall defining an enclosed chamber for holding the electroviscous fluid. A piston assembly is constructed of electrically conductive material and includes a piston head adapted for reciprocal movement within the enclosed chamber in a direction at least substantially parallel to the central axis of the inner elongate electrode. The piston assembly also includes a shaft extending from the piston head and out of the housing. At least one bore extends through the piston head with an inner surface of the bore forming the outer electrode. With this arrangement, movement between the piston assembly and the housing is damped when an electric field is applied to the electroviscous fluid between the inner and outer electrodes within the at least one bore.

The housing may be formed of electrically conductive material that is electrically isolated from the outer electrode. The inner elongate electrode extends between the bottom and top walls of the housing to be in electrical contact with the housing. Alternatively, the inner electrode may be isolated from the housing and connected directly to a high voltage source.

According to a further embodiment of the invention, a plurality of bores extend through the piston head to form a plurality of outer electrodes, while one or more of the inner elongate electrodes extend coaxially through one or more of the bores. The inner electrodes are electrically isolated from the bores and are preferably electrically isolated from the housing. When a plurality of inner electrodes are used, a high voltage source may be separately connected between each of the inner electrodes and the piston head (and thus the outer electrodes). In this manner; the high voltage source can be selectively applied to one or more of the bores depending on the amount of damping required. At least one of the bores may have a different diameter than at least another of the bores in order to vary the amount of damping, especially if a single high voltage supply is used.

According to an even further embodiment of the invention, a variable resistance device includes at least one inner elongate, flexible electrode having a longitudinal central axis, at least one outer electrode spaced from the inner electrode and at least partially surrounding the inner elongate electrode to form a gap therebetween, and an electroviscous fluid positioned in the gap between the inner and outer electrodes. Both of the inner and outer electrodes are elongate and flexible. A nonconductive or dielectric spacer may be positioned between the inner and outer electrodes to maintain a gap therebetween during flexure of the variable resistance device. The term "nonconductive" as used herein refers to materials with less conductivity than the electroviscous fluid. The spacer may comprise a porous or nonporous material, and it may be flexible or rigid. In one embodiment, the outer electrode is a hollow spring having at least one coil.

According to an even further embodiment of the invention, a variable damping device includes a housing having a bottom wall, at least one side wall, and a top wall defining an enclosed chamber. At least one inner elongate electrode with a longitudinal central axis extends into the chamber from at least one of the bottom and top walls. A piston assembly is constructed of electrically conductive material and includes a piston head adapted for reciprocal movement within the enclosed chamber and a shaft extending from the piston head and out of the housing. At least one bore extends through the piston head. An inner surface of the at least one bore forms an outer electrode that at least partially surrounds the inner elongate electrode and forms a gap therebetween. Preferably, the outer electrode has a longitudinal axis that is at least substantially coaxial with the central axis of the inner elongate electrode. An electroactive fluid, such as ER fluid or electrophoretic fluid, is positioned in the enclosed chamber and in the gap between the inner and outer electrodes. Relative movement between the piston assembly and the housing is damped when an electric field is applied to the electroactive fluid between the inner and outer electrodes within the at least one bore.

BRIEF DESCRIPTION OF THE DRAWINGS

The invention will now be described with reference to the drawings in which:

FIG. 1 is an orthogonal view of a variable resistance device according to a first embodiment of the invention;

FIG. 2 is a sectional view of the variable resistance device taken along line 2—2 of FIG. 1;

FIG. 2A is a sectional view of the variable resistance device similar to FIG. 2 according to a second embodiment of the invention;

FIG. 3 is a sectional view of the variable resistance device taken along line 3—3 of FIG. 1;

FIG. 3A is a sectional view similar to FIG. 3 of the variable resistance device according to the second embodiment of the invention;

FIG. 4 is a side elevational view of an inner portion of the variable resistance device according to a third embodiment of the invention;

FIG. 5 is a top plan view of a spacer disk taken along line 5—5 of FIG. 4;

FIG. 6 is a cross sectional view of a variable resistance device according to a fourth embodiment of the invention;

FIG. 8 is a front elevational view of a variable resistance device incorporated into a spring according to a fifth embodiment of the invention;

FIG. 9 is a cross sectional view of the variable resistance device taken along line 9—9 of FIG. 8.

DETAILED DESCRIPTION OF THE PREFERRED EMBODIMENTS

Figure 7:
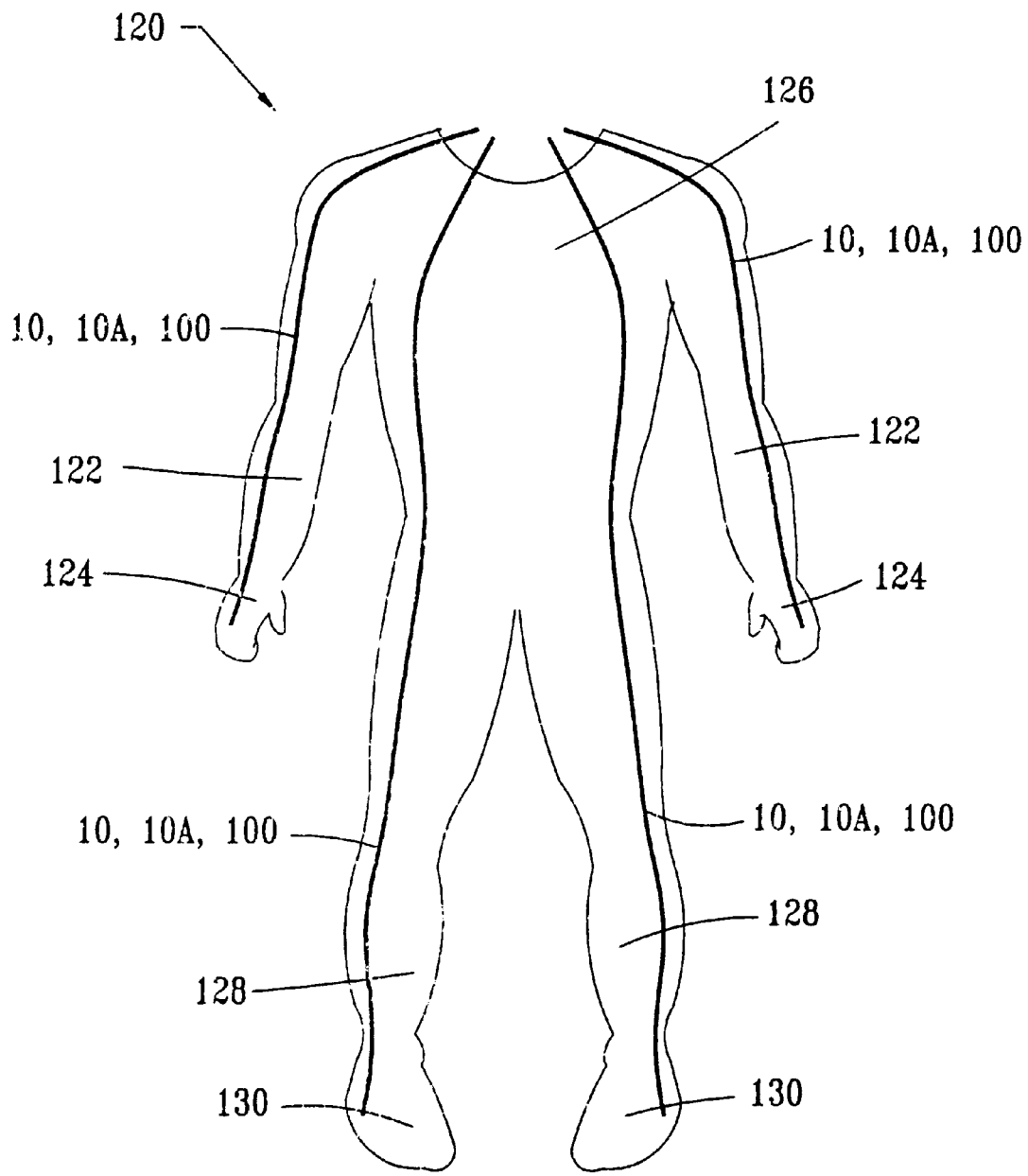
FIG. 7 is a front elevational view of a force resistance suit employing a plurality of variable resistance devices.

Referring now to the drawings, and to FIGS. 1 and 2 in particular, a variable resistance device 10 comprises a tubular member 12, an outer electrode 14, an inner electrode 16, and a spacer 18 located between the outer and inner electrodes. The tubular member 12 is flexible along its length and is preferably constructed of a material that is resistant to oil and any abrasives that may be in the oil, as will be described in greater detail below. A polyurethane material, such as polyether or polyester, may be used for the tubular member 12.

The outer electrode 14 is positioned in proximity to an inner surface 20 of the tubular member and extends substantially along the length thereof Preferably, the electrode 14 is also tubular in shape and flexible along its length so as to flex with the tubular member 12. The electrode 14 is constructed of a flexible conductive material, such as wire mesh commonly found in coaxial cables. Alternatively, the electrode 14 may be constructed of conductive foam, such as carbon-impregnated open cell polyurethane foam. When constructed of conductive foam, the electrode 14 may be bonded to the inner surface 20 of the tubular member 12 through heat, adhesives, or other well-known techniques. Alternatively, the electrode 14 may be loosely positioned within the tubular member or may be formed directly on the inner surface 20 through vacuum deposition, etc. In any case, the electrode 14 and tubular member 12 preferably extend along a common central axis 22.

The inner electrode 16 also extends along the central axis 22 and is also formed of a flexible conductive material, such as multi-strand electrical wire. Alternatively, the inner electrode 16 may be constructed of conductive foam, such as carbon-impregnated open cell polyurethane foam.

The spacer 18 can be formed of a flexible, compressible nonconductive or dielectric material, such as open cell polyurethane foam. Alternatively, a flexible, incompressible, porous material can be used for the spacer. The spacer 18 extends along the length of the tubular member 12 and is positioned between the electrodes 14 and 16. The spacer 18 serves to maintain a gap between the electrodes as the tubular member 12 is flexed.

When open cell foam is used for the electrodes and spacer member, the electrodes 14 and 16 are preferably of a minimal thickness or a minimal cross sectional area and the spacer 18 is of a diameter that causes compression of the outer electrode 14 against the inner wall 20 of the tubular member to further minimize the thickness of the outer electrode, and also compresses the inner electrode 16 to minimize its thickness or cross sectional area. An electroviscous fluid, such as an electrorheological (ER) fluid fills the cells of the spacer 18 and is in electrical contact with the electrodes 14 and 16. Depending on the amount of compression that the electrodes 14 and 16 undergo, the ER fluid may also entirely or partially fill the cells of the electrodes.

ER fluids typically comprise a non-conducting, electrically insulating liquid or liquid mixture, such as silicone-based oils, mineral oils, hydrocarbon oils, etc., and a dispersal of solid particles that exhibit a measure of conductivity or semiconductivity within the oil. Hence, the materials chosen for the tubular member 12, electrodes 14, 16 and spacer 18 must be compatible with the particular type of non-conductive liquid used, and must also be resistant to abrasion that may result from movement of the dispersed particles. Although particular materials have been given by way of example, it is to be understood that other materials may be used for the tubular member, electrodes and spacer, such as elastomers, polymers, metal, etc. The size of the cells in the spacer electrodes and spacer may be in the range from under 5 to over 100 pores per inch (ppi), but should be large enough to allow the ER fluid to maintain continuous electrical contact between the outer and inner electrodes during movement of the resistance device 10.

In some applications, it may be advantageous to have larger pores to allow the free flow of ER fluid through the foam spacer material, while in other applications, it may be advantageous to have smaller pores to resist movement of fluid through the foam spacer material, especially when an electrical field is applied to the ER fluid.

Although the electrodes, spacer and tubular member have been described as separate components, two or more of these components may be integrally formed during manufacturing, such as through simultaneous extrusion. Alternatively, an outer surface of the spacer 18 can be coated with a conductive liquid and cured to form the outer electrode 14. A stranded, flexible electrical cable can then be inserted into the foam along a central axis thereof to form the inner electrode 16. The assembly thus formed is then installed into the flexible tubular member 12.

Referring now to FIG. 3, an electrical coupler 24 seals a first end 26 of the tubular member 12 while an end cap or plug 28 (FIG. 1) seals a second end 30 of the tubular member. The plug 28 is preferably formed as an integral end wall of the tubular member 12, but can be separately formed and sealed to the second end 30 in a well-known manner. The electrical coupler 24 includes an electrically conductive rotating body portion 32 coupled to an electrically conductive stationary body portion 34. The rotating body portion 32 has internal threads 36 for receiving a complementary externally threaded electrical coupler (not shown) that forms part of an electrical power source (not shown). A torque head 38 is located at a lower end of the rotating body portion and has a plurality of faces 40 for engagement by a wrench or similar device for tightening the electrical coupler 24 to its complementary coupler. The stationary body portion 34 includes an upper flange 42 that is received within an internal groove 44 of the rotating body portion 32. The thickness of the upper flange 42 is slightly less than the width of the groove 44 to permit rotation between the two body portions. When assembled, the two body portions are in electrical contact with each other, and an internal bore 46 of the body portion 32 is coaxial with an internal bore 48 of the body portion 34. A ledge 50 extends inwardly from a surface of the internal bore 48 and supports an annular disk 52 formed of electrically insulating material. A conical electrical connector 54 is mounted centrally in the annular disk 52 and is electrically isolated from the two body portions 32 and 34. The conical shape of the connector 54 assures a tight connection to a corresponding aperture in the complementary coupler (not shown) when the electrical coupler 24 is mounted thereto. A lower annular stem portion 56 fits into the open end of the tubular member 12 for attaching the electrical coupler 24 thereto. Preferably, the outside diameter of the stem portion 56 is equal to or slightly less than the inside diameter of the outer electrode 14 to provide a snug fit therebetween and assure electrical contact between an outer surface 58 of the annular stem portion 56 and an inner surface 60 of the outer electrode. A band clamp 62 is positioned on an outer surface 64 of the tubular member 12 in an area that overlaps the stem portion 56 to compress the tubular member against the stem portion and provide a fluid-tight connection between the electrical coupler 24 and the tubular member 12. With the above-described arrangement, the inner electrode 16 is in electrical contact with the conical connector 54 and the rotating body portion 32 is in electrical contact with the outer electrode 14. In this manner, electrical power can be applied to the ER fluid along the entire length of the tubular member 12 to vary the stiffness of the device 10.

FIG. 2A is a cross sectional view similar to FIG. 2 of a variable resistance device 10A according to a second embodiment of the invention, wherein like parts in the previous embodiment are represented by like numerals. The variable resistance device 10A is similar in construction to the previous embodiments with the exception of additional concentric electrodes 66, 68 that are positioned between the outer electrode 14 and inner electrode 16 and extend along the length of the tubular member 12. The electrodes 14, 66, 68, and 16 are separated from each other by concentric spacers 70, 72 and 74, respectively. The spacers 70, 72 and 74 can be similar in construction to spacer 18. The electrodes 14 and 68 are preferably connected to the negative or ground side of an electrical power source 15, while the electrodes 16 and 66 are preferably connected to the positive side of the electrical power source. Of course, the polarity of the electrodes can be reversed. Thus, power can be applied to the ER fluid between adjacent pairs of electrodes to thereby change the viscosity of the fluid.

In FIG. 3A, an electrical coupler 24A that forms part of the variable resistance device 10A is illustrated, wherein like parts in the previous electrical coupler embodiment are represented by like numerals. The electrical coupler 24A is similar in construction to the electrical coupler 24 with the exception of additional electrical contacts 80 and 82 that are positioned between the conical connector 54 and the rotating body portion 32 for connection to the electrodes 66 and 68, respectively. The annular insulating disk 52 is fitted with corresponding apertures to receive the electrical contacts 80 and 82. A second annular disk 84 is positioned within the lower flange 56 and includes three apertures (not labeled) for receiving the inner electrode 16 and a lower end of the electrical contacts 80 and 82.

In place of the continuous elongate spacer 18 shown in FIG. 1, and with reference now to FIGS. 4 and 5, a spacer assembly 90 can be constructed from a plurality of disks 92 having pores 94 extending therethrough. Preferably, the disks 92 are constructed of a non-conductive material, such as plastics or ceramics, spaced at discrete intervals along the length of the inner electrode 16. In such an arrangement, the disks would preserve the spacing between the inner electrode 16 and outer electrode 14. The disks need not be flexible to preserve the flexibility of the resistance device. As in the previous embodiment, the ER fluid fills the space between the inner and outer electrodes, including the pores 94 in each disk. When the tubular member 12 is flexed, the ER fluid moves between the disks and through the disk pores 94. The greater the amount of voltage present at the inner and outer electrodes, the more difficult it will be for the disks to rotate toward or away from each other, thereby resulting in a stiffer resistance device.

With reference now to FIG. 6, a resistance device 100 according to a further embodiment of the invention includes an outer semi-cylindrical tubular member 102, an outer electrode 104 abutting an inner surface of the tubular member 102, an inner electrode 106 positioned centrally between the ends 108 and 110 of the outer electrode 104, and a spacer 112 separating the outer and inner electrodes. As in the previous embodiments, the tubular member, electrodes and spacer are flexible, and an ER fluid fills the space between the inner and outer electrodes.

One possible application of the above-described resistance device embodiments 10, 10A and 100 is shown in FIG. 7. A variable resistance suit 120 that may be used for exercise or for simulating G-forces in simulators, includes a torso portion 126, sleeve portions 122 connected to an upper end of the torso portion, a hand portion 124 extending from each sleeve portion, leg portions 128 connected to a lower end of the torso portion 126, and a foot portion 130 extending from each leg portion 128. A variable resistance device 10, 10A or 100 is preferably positioned across joints of the torso, arm, hand, leg, and foot portions to provide resistance to movement of all major muscle groups of a person wearing the exercise suit 120 when voltage is applied to the variable resistance devices. The amount of resistance to movement can be increased or decreased by increasing or decreasing the amount of applied voltage, respectively, and/or by decreasing or increasing the size of the cells or pores in the spacer material, changing the gap size between the electrodes, etc.

The variable resistance devices 10, 10A and 100 are also useful in other applications where shock absorbers or other damping devices are normally used, such as between a frame and suspension arm of a vehicle, for damping relative movement therebetween.

With reference now to FIGS. 8 and 9, a variable dampening spring 140 according to a further embodiment of the invention is shown mounted between a lower member 142 and an upper member 144. The lower and upper members 142 and 144 may be a suspension arm and frame, respectively, of a vehicle, and the variable dampening spring 140 can replace the spring and shock absorber normally associated with the vehicle suspension. The variable dampening spring 140 preferably has a plurality of coils 146. An electrical coupler 150, which may be similar to the coupler 24 previously described, is connected to one end of the spring 140.

As shown in FIG. 9, the spring 140 includes an outer electrically conductive tube 152, an inner electrode 154, and a spacer 156 positioned between the tube 152 and electrode 154. The spacer 156 is preferably constructed of a flexible, compressible nonconductive or dielectric material, such as open cell polyurethane foam. Alternatively, a flexible, incompressible, porous or nonporous material can be used for the spacer, such as the disks 92 shown in FIG. 4. The spacer 156 extends along the length of the tube 152 and is positioned between the tube 152 and outer electrode 154 for maintaining a gap between the tube and electrode. As in the previous embodiments, an electroviscous fluid, such as an ER fluid, fills the space or gap between the tube and inner electrode, including any cells or pores of the spacer 156, and is in contact with the outer conductive tube 152 and inner electrode 154. When electrical power is applied across the ER fluid via the conductive tube 152 and electrode 154, the spring 140 resists movement due to an increase in viscosity of the ER fluid. The amount of damping during operation can be increased or decreased by increasing or decreasing the amount of applied voltage, respectively.

Figures 10, 11:
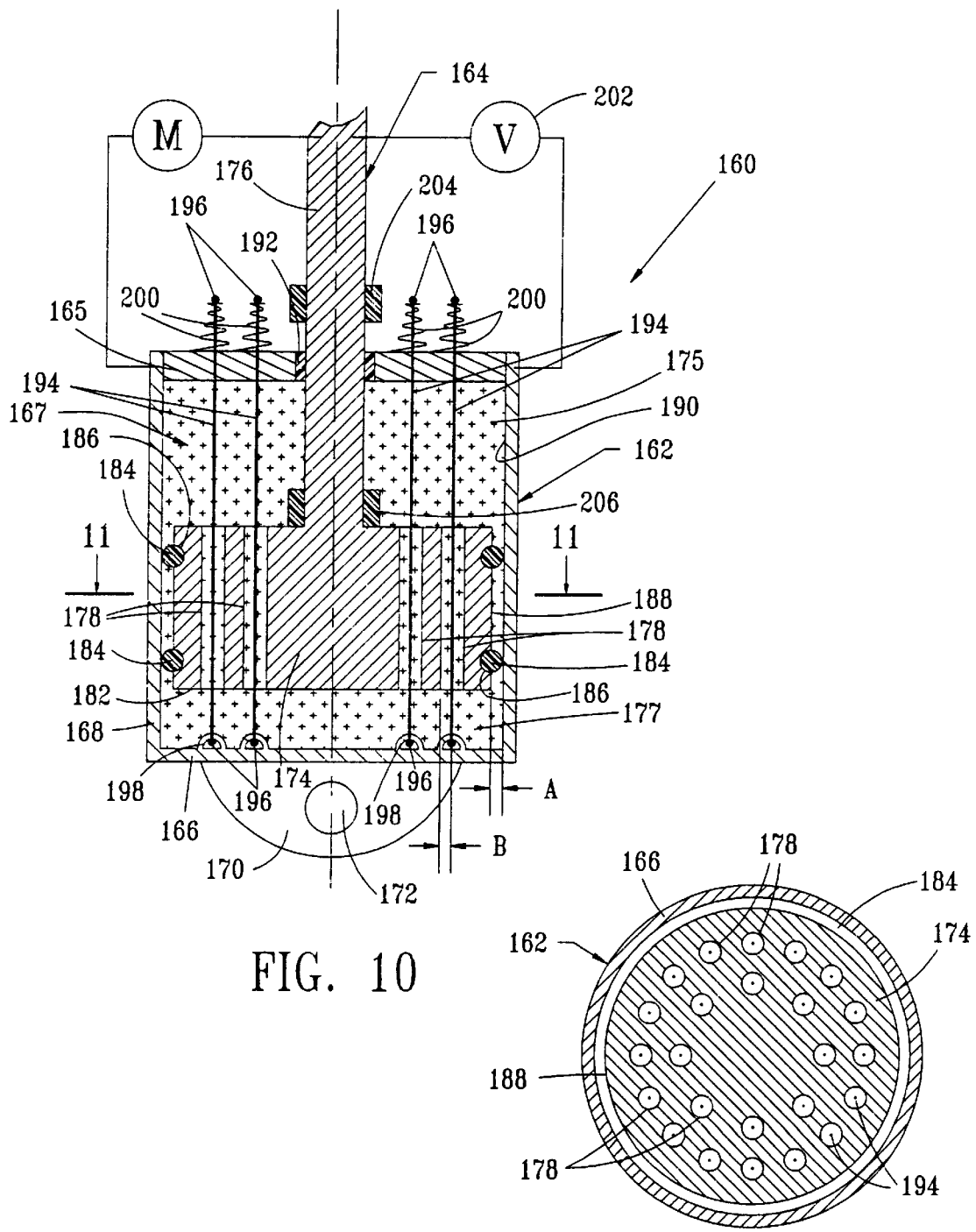
FIG. 10 is a cross sectional view of a variable resistance device according to a sixth embodiment of the invention.
FIG. 11 is a cross sectional view of the variable resistance device of FIG. 10 taken along line 11—11 of FIG. 10.

Referring now to FIGS. 10 and 11, a variable damping device 160 according to an even further embodiment of the invention includes an electrically conductive housing 162 that is preferably cylindrical, and an electrically conductive piston assembly 164 that reciprocates in the housing 162. The housing 162 comprises a bottom wall 166, preferably integrally formed with a side wall 168. A lower mounting flange 170 projects downwardly from the bottom wall 166 and has an opening 172 for mounting the damping device 160 to a support structure in a well-known manner. An end cap 165 is mounted to an upper end of the side wall 168 to form an enclosed chamber 167 within the housing 162. The end cap can be mounted to the side wall through welding, press-fitting, clamps, cooperating threads between the end cap and side wall, etc.

The piston assembly includes a piston head 174 attached to a reciprocating shaft 176. The head divides the enclosed chamber 167 into an upper chamber portion 175 and a lower chamber portion 177. A plurality of bores 178 are formed in the head 174, preferably in circular arrays, as shown in FIG. 11. The bores 178 extend from an upper surface 180 to a lower surface 182 of the head 174. Although two circular arrays of bores are shown, it is to be understood that more or less arrays may be provided. Alternatively, the bores may be formed randomly in the head 174 or follow any other desired pattern. A pair of nonconductive or dielectric annular spacers 184 are mounted in grooves 186 formed in the circumferential side surface 188 of the head 174 to keep the side surface a constant distance from an inner surface 190 during reciprocating movement of the head 174 within the housing. Preferably, the annular spacers 184 are constructed of an electrically insulating and wear-resistant material such as nylon or Teflon (PTFE). The provision of two axially spaced annular spacers 184 helps to stabilize the head 174 during movement. In an alternative embodiment, the spacers 184 can be replaced by a single tubular spacer that extends axially along the side surface 188 of the piston head 174.

A reciprocating shaft seal 192 is mounted in an opening in the end cap 165 in a well-known manner and receives the shaft 176. With this arrangement, the piston assembly 164 is electrically isolated from the housing 162. A high-tensile electrically conductive wire 194 extends between the bottom 166 and end cap 165 of the housing 162 and preferably through the axial center of each bore 178. The wires 194 may be similar to high voltage corona wires commonly used in toner-type photocopying machines. The ends of each wire 194 are terminated in an enlarged head or ball 196. A lower wire mounting assembly or cavity 198 is provided on the bottom wall 166 for each wire 194. The ball 196 at the lower end of each wire is received into one of the cavities while an upper end of each wire 194 extends through the end cap 165 through suitable apertures. An upper wire mounting assembly or compression spring 200 is provided for each wire 194 on an outer surface of the end cap 165. The ball 196 at the upper end of each wire seats against the compression spring 200 for holding each wire in tension. The amount of tension on each wire can be adjusted by varying the spring dimensions and wire length. Alternatively, the springs can be eliminated and the wires 194 held taut by clamps, screws, etc., mounted to the end cap 165, or by welding the wires to the end cap.

An ER fluid preferably fills the upper and lower portions 175, 177 of the enclosed chamber 167, including the bores 178 in the piston head 174. A high voltage power source 202 is connected to the conductive housing 162 and the conductive piston assembly 164. Since the wires 194 are electrically connected to the housing 162, a high voltage is present at the wires 194 and the inner surfaces of the bores when the power source 202 is actuated.

In operation, as the piston head 174 reciprocates within the housing 162 due to external forces applied to the shaft 176 and/or the housing 162, the ER fluid is forced through the bores 178 which may create a relatively small resistance to movement or slight damping action of the piston assembly 164 with respect to the housing 162, due to the initially low viscosity of the ER fluid. When high voltage is applied to the ER fluid between the outer surface of the wires 194 and the inner surface of their respective bores 178, the viscosity of the ER fluid within the bores greatly increases, resulting in a relatively high resistance to movement or high damping action of the piston assembly 164 with respect to the housing 162. The actual amount of damping force desired before and after actuating the power source can be set during manufacture by varying the number of bores and their diameter and length, and by varying the wire diameter. The inner surface of the bores may also be roughened for greater resistance to fluid flow. A gap "B" between an outer surface of each wire and the inner surface of its associated bore is preferably constant around the inner circumference of the bore and along its length. This gap is preferably kept minimal to minimize voltage requirements, since larger voltages are necessary with increasing gap sizes. A gap "A" between an outer circumference 188 of the piston head 174 and an inner surface 190 of the wall 168 is preferably equal to or greater than the gap "B".

If desired, upper and lower stop members 204, 206 formed of a nonconductive or dielectric material can be provided on 176 to limit travel of the piston assembly 164 with respect to the housing 132 and to eliminate electrical shorts that would otherwise occur if the housing and piston assembly 164 were in mutual contact.

A displacement measuring device 208 can be connected between the piston assembly 164 and the housing 132 in order to measure the relative displacement of the piston assembly with respect to the housing. When relative displacement is measured over time, the relative velocity or acceleration between the piston assembly and housing can be determined and used to adjust the amount of damping force required. The measuring device 208 can be of the well-known optical, electrical, or electromagnetic types, and will therefore not be further described.

Figures 11A, 12:
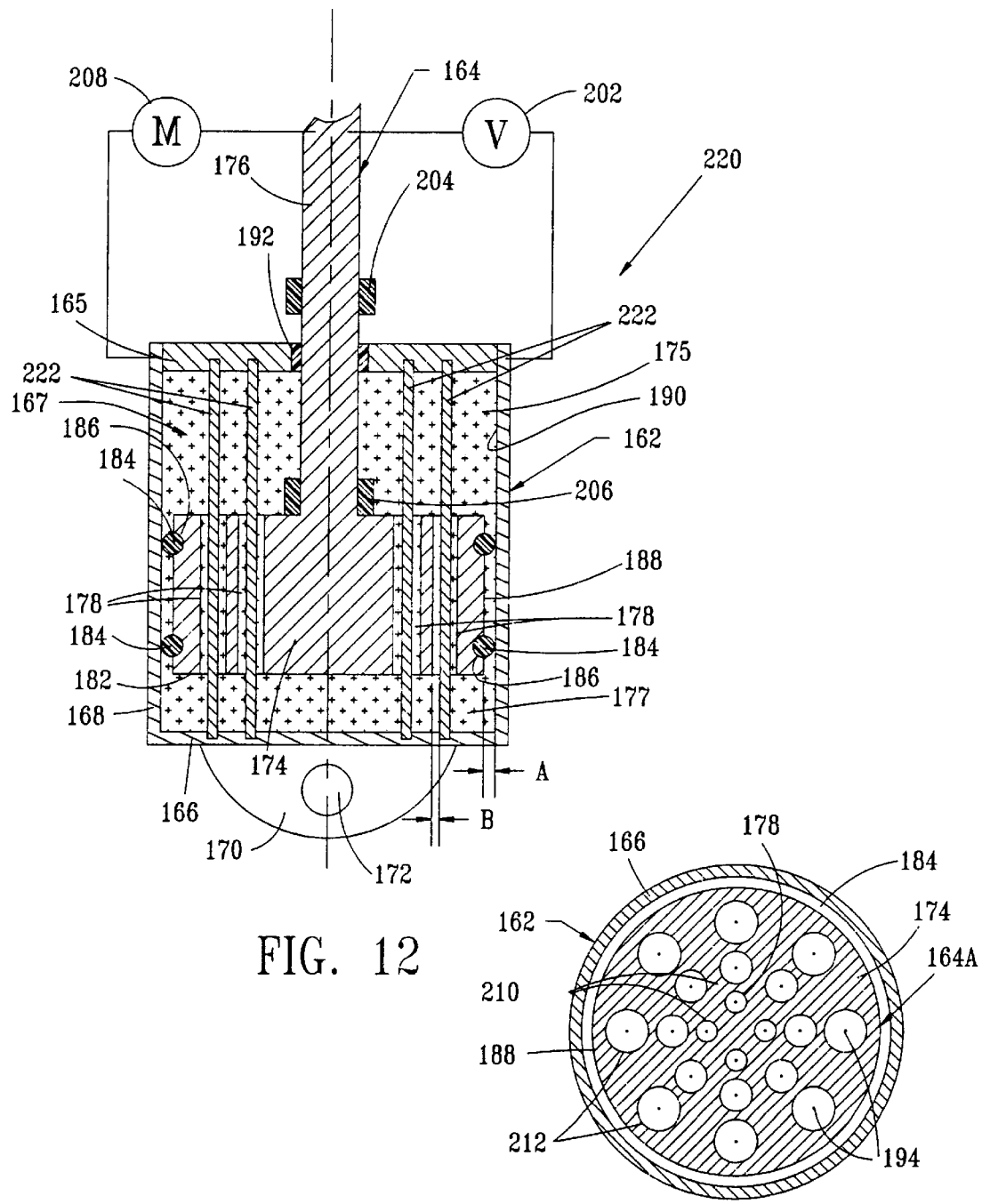
FIG. 11A is a cross sectional view similar to FIG. 11 of the variable resistance device according to a seventh embodiment of the invention.
FIG. 12 is a cross sectional view similar to FIG. 10 of a variable resistance device according to an eighth embodiment of the invention.

With reference now to FIG. 11A, a piston assembly 164A according to a further embodiment of the invention is shown, wherein like parts in the previous embodiment are represented by like numerals. In this embodiment, a circular array of small diameter bores 178 are circumscribed in a circular array of medium diameter bores 210, which are in turn circumscribed in a circular array of large diameter bores 212. The larger the diameter bore, the larger the gap between the wire 194 and the inner surface of the bore. With the larger gap, the viscosity of the ER fluid in the larger diameter bores would not reach the same viscosity as the ER fluid in the smaller diameter bores under the same applied voltage. Consequently, the larger diameter bores would exhibit less damping action than the smaller diameter bores. With this arrangement, selective damping action can be accomplished by applying voltage to one or more of the small, medium, or large bores or any combination thereof from a low-cost constant high voltage power supply, as opposed to a higher cost variable voltage power supply. Although the bores 178, 210 and 212 are shown as three different diameters arranged in three separate circular arrays, it is to be understood that any desired combination of bores of various diameters can be arranged in any desired manner or pattern throughout the piston head. It should be noted that the gap "A" in this embodiment should be equal to or greater than the largest gap "B".

With reference now to FIG. 12, a variable damping device 220 according to an even further embodiment of the invention is illustrated, wherein like parts in the previous embodiment are represented by like numerals. The variable damping device 220 is similar in construction to the variable damping device 160, with the exception that the wires and their holding and tensioning assemblies are replaced with relatively stiff, electrically conductive rods or studs 222 that are aligned and rigidly mounted to the housing 162 and end cap 165. As shown, both ends of the rods 222 terminate inside the housing 162. As in the previous embodiment, each rod 222 extends through one of the bores. Preferably, the center axis of each rod is coaxial with the center axis of each bore. The gap size "B" between the outer surface of each rod 222 and its associated bore is shown as constant for all of the bores. However, as in the previous embodiments, the gap size "B" can be varied during manufacture by adjusting the outer diameter of the rod and/or the inner diameter of the bore and its length.

Figure 12A:
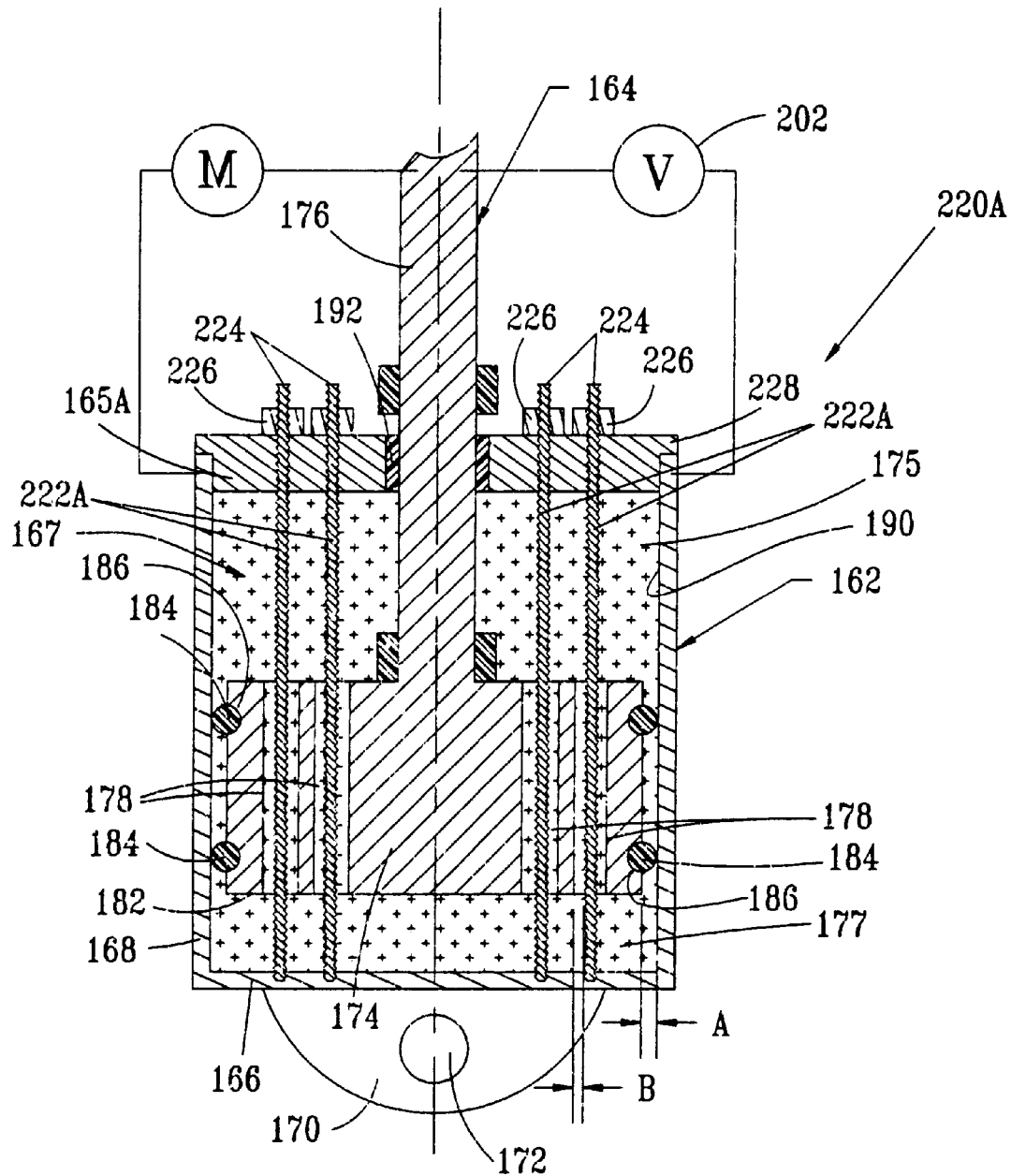
FIG. 12A is a cross sectional view similar to FIG. 12 of a variable resistance device according to a ninth embodiment of the invention.

As shown in FIG. 12A, a variable damping device 220A according to a further embodiment is illustrated, wherein like parts in the previous embodiment are represented by like numerals. The variable damping device 220A is similar in construction to the variable damping device 220, with the exception that the rods 222 are replaced with threaded studs 222A, and the end cap 165 is replaced with an end cap 165A having a peripheral flange 228. A lower end of the studs 222A are threaded into the bottom wall 166 while an upper end 224 of the studs extend through the end cap 165A. A nut 226 is threaded onto the upper end 224 of each stud 222A to compress the flange 228 of the end cap against an upper edge of the wall 168. A gasket (not shown) may be located between the flange 228 and the end wall for sealing the end cap 165A to the housing 162. Thus, the studs 222A and end cap 165A are held securely in place and in alignment with the bores. The threads of each stud preferably extend along its length to provide greater resistance to fluid flow in its associated bore, especially when an electric field is applied to the ER fluid. However, each stud may be threaded at only one or both ends for mechanical and electrical mounting to the housing and/or end cap only. With the threads extending along the length of each stud, an electrophoretic fluid may be used in place of the ER fluid. If an electrophoretic fluid is used, nonconductive rings (not shown) may be axially spaced along one or more of the studs in place of the threads, and/or along the inner surface of selected bores.

The alignment of each wire or rod along a central axis of its respective bore is important in each of the above-described damping devices 160, 220 and 220A when it is desirous to maintain a constant gap "B" between an outer surface of the wire rod and the inner surface of the bore. The constant gap "B" ensures a uniform change in viscosity of the ER fluid in the bore. Cooperating alignment tabs and depressions (not shown) on the end cap 165 and side wall 168 may be provided to assure that the wires or rods are properly oriented and aligned during manufacture. Rotational movement of the piston assembly 164 about its longitudinal axis with respect to the housing should also be restrained in any well-known manner so as to prevent the mutual contact between the bore surfaces and the wires or rods.

In each of the damping devices 160, 220 and 220A, adjustment of the damping force during operation can be accomplished by varying the amount of voltage applied to all of the bores. Alternatively, the damping force can be varied by selectively applying the voltage across the gap "B" in one or more of the bores. It will be understood, of course, that the high voltage power supply must be connected directly to the wires or rods in order to selectively apply the voltage to one or more of the bores. In this instance, the housing must be constructed of nonconductive or dielectric material having less conductivity than the electroviscous fluid, or an insulating sleeve (not shown) must surround each wire or rod where it passes through the housing and/or end cap to electrically isolate the wires from the housing. Adjustment of the damping force can also be accomplished by varying the voltage across the gap "B" in one or more of the bores.

Each bore in the damping devices 160, 220 and 220A may include one or more nonconductive or dielectric porous spacers or guides, such as the disks 92 in FIG. 4, or may be filled with a porous spacer constructed of nonconductive or dielectric material that is less conductive than the ER fluid, in order to maintain the spacing between the wires or rods and the inner surfaces of the bores and to provide greater resistance to ER fluid flow within the bores. When spacers or guides are provided with the device 160, the wires will be properly aligned in the bores. Accordingly, greater tolerance may be permitted with the location of the wire mounting assemblies.

While particular embodiments of the invention have been shown, it will be understood that the invention is not limited thereto since modifications may be made by those skilled in the art, particularly in light of the foregoing teachings. For example, although an elongate central electrode is shown extending through each bore, it is to be understood that there may be more bores than elongate central electrodes, which may help to reduce unwanted damping when the high voltage power source is on stand-by. If the ER fluid in the selected bores is made sufficiently thick, the selected bores may function as on/off valves to stop or impede the flow of fluid therethrough, while fluid flow through the remaining bores is left unchanged. With more bores, quicker recovery of spring and damper systems employing the damping devices described above is made possible. In addition, the shape of the bores may be altered to affect fluid flow therethrough. For example, one or more of the bores may be tapered or hour-glass shaped.

Moreover, although the piston head is shown as a relatively thick member, it can alternatively be plate-shaped with openings or bores extending therethrough. The plate may be formed with reinforcing ribs to maintain its structural integrity when subjected to stress.

Reasonable variation and modification are possible within the foregoing disclosure of the invention without departing from the scope of the invention.

The embodiments for which an exclusive property or privilege is claimed are defined as follows:

1. A variable resistance device, comprising:
   at least one inner elongate, flexible electrode having a longitudinal central axis;
   at least one outer elongate, flexible electrode spaced from the inner electrode and at least partially surrounding the inner elongate electrode to form a gap therebetween; the outer electrode having a longitudinal axis that is at least substantially coaxial with the central axis of the inner electrode;
   a spacer positioned between the inner and outer electrodes to maintain the gap between the inner and outer electrodes during flexure of the variable resistance device; and
   an electroviscous fluid positioned in the gap between the inner and outer electrodes;
   wherein an electric field applied to the electroviscous fluid between the inner and outer electrodes causes an increase in the stiffness of the device.

2. A variable resistance device according to claim 1 wherein the spacer comprises a porous material.

3. A variable resistance device according to claim 2 wherein the spacer is flexible.

4. A variable resistance device according to claim 3 wherein the spacer comprises a compressible foam material.

5. A variable resistance device according to claim 2 wherein the spacer is rigid.

6. A variable resistance device according to claim 5 wherein the spacer comprises a plurality of disks connected to one of the inner and outer electrodes.

7. A variable resistance device according to claim 1 wherein the outer electrode is a hollow spring having at least one coil.

8. A variable damping device, comprising:
   a housing having at least one side wall connected between a bottom wall and a top wall and defining an enclosed chamber;
   at least one inner elongate electrode extending into the chamber from at least one of the bottom and top walls, the inner electrode having a first central axis;
   a piston assembly including a piston head having a second central axis and being adapted for reciprocal movement within said enclosed chamber and a shaft having a proximal end connected to the piston head for reciprocal movement therewith and a distal end extending out of said housing; and
   at least one bore extending through said piston head, an inner surface of said at least one bore being electrically conductive and forming an outer electrode that surrounds the inner elongate electrode with a gap therebetween; the outer electrode having a third central axis that is at least substantially coaxial with the first central axis of the inner electrode and is offset from the second central axis of the piston head; and
   an electroactive fluid positioned within the enclosed chamber and the gap between the inner and outer electrodes;
   wherein movement between said piston and said housing is damped when an electric field is applied to the electroactive fluid between the inner and outer electrodes within the at least one bore.

9. A variable resistance device according to claim 8 and further wherein the housing is formed of electrically conductive material that is electrically isolated from the outer electrode; and further wherein the inner elongate electrode extends between the bottom and top walls of the housing, the inner elongate electrode being in electrical contact with the housing.

10. A variable resistance device according to claim 8 and further comprising a plurality of bores extending through the piston head, the inner surface of the bores forming a plurality of outer electrodes; and wherein said at least one inner electrode comprises a plurality of inner electrodes, the inner electrodes extending through a corresponding number of said bores.

11. A variable resistance device according to claim 10 wherein at least one of the bores has a different diameter than at least another of the bores.

12. A variable resistance device according to claim 10 wherein the number of bores is greater than the number of inner electrodes.

13. A variable resistance device according to claim 8 and further wherein the at least one inner electrode is electrically isolated from the housing; and further comprising a high voltage source connected between the inner elongate electrode and the outer electrode.

14. A variable resistance device according to claim 13 wherein the at least one bore comprises a plurality of bores extending through the piston head, the inner surface of the bores forming a plurality of outer electrodes; and wherein said at least one inner electrode comprises a plurality of inner electrodes, the inner electrodes extending through a corresponding number of said bores; each of said inner electrodes being connected to the high voltage source for individual application of an electric field to the electroviscous fluid within selected bores.

15. A variable resistance device according to claim 14 wherein at least one of the bores has a different diameter than at least another of the bores.

* * * * *